US012656297B2

(12) United States Patent
Brandt et al.

(10) Patent No.: US 12,656,297 B2
(45) Date of Patent: Jun. 16, 2026

(54) ARRANGEMENT AND METHOD FOR DETERMINING HYDROGEN PURITY

(71) Applicant: Siemens Energy Global GmbH & Co. KG, Munich (DE)

(72) Inventors: Torsten Brandt, Forchheim (DE); Michael Braunecker, Nuremberg (DE); Stefan Siedler, Adelsdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 303 days.

(21) Appl. No.: 18/036,512

(22) PCT Filed: Oct. 26, 2021

(86) PCT No.: PCT/EP2021/079657
§ 371 (c)(1),
(2) Date: May 11, 2023

(87) PCT Pub. No.: WO2022/106159
PCT Pub. Date: May 27, 2022

(65) Prior Publication Data
US 2024/0011935 A1 Jan. 11, 2024

(30) Foreign Application Priority Data

Nov. 19, 2020 (DE) ..................... 10 2020 214 583.0

(51) Int. Cl.
*G01N 27/407* (2006.01)
*G01N 27/417* (2006.01)
(52) U.S. Cl.
CPC ......... *G01N 27/407* (2013.01); *G01N 27/417* (2013.01)

(58) Field of Classification Search
CPC .... G01N 27/407; G01N 27/417; Y02E 60/50; H01M 8/04552; H01M 8/04559; H01M 8/249; H01M 8/04447; H01M 8/04798
See application file for complete search history.

(56) References Cited

U.S. PATENT DOCUMENTS

2003/0022041 A1* 1/2003 Barton .............. H01M 8/04231
429/432
2003/0203253 A1* 10/2003 Clingerman .......... H01M 8/242
429/432

(Continued)

FOREIGN PATENT DOCUMENTS

DE 102014009772 A1 1/2016
EP 1339125 A2 8/2003

(Continued)

OTHER PUBLICATIONS

Stuhler et al., EP1942544A1, English translation. 2008 (Year: 2008).*

(Continued)

*Primary Examiner* — Shizhi Qian
(74) *Attorney, Agent, or Firm* — Wolter Van Dyke Davis, PLLC

(57) ABSTRACT
A device and method for determining the purity of hydrogen, includes a measurement fuel cell cascade having at least one measurement fuel cell, a hydrogen inlet and a hydrogen outlet, a cell voltage monitoring unit that is electrically connected to the measurement fuel cell stack and monitors a voltage output of the measurement fuel cell stack, and a valve located downstream of the measurement fuel cell cascade in the direction of flow of the hydrogen for allowing dead-end operation of the measurement fuel cell cascade. The device for determining the purity of hydrogen further includes an evaluation unit that is connected to the cell voltage monitoring unit and receives a signal corresponding (Continued)

to a voltage output of the measurement fuel cell cascade from the cell voltage monitoring unit as a function of time, wherein the evaluation unit is designed to determine the purity of the hydrogen from the received signal.

14 Claims, 3 Drawing Sheets

(56) References Cited

U.S. PATENT DOCUMENTS

| | | | | |
|---|---|---|---|---|
| 2005/0056661 | A1* | 3/2005 | Casamatta | H01M 8/04089 |
| | | | | 222/3 |
| 2007/0172709 | A1* | 7/2007 | Nakakubo | H01M 8/04082 |
| | | | | 429/513 |
| 2008/0145718 | A1 | 6/2008 | Bette | |
| 2009/0004515 | A1* | 1/2009 | Mogi | H01M 8/04231 |
| | | | | 429/411 |
| 2015/0346140 | A1* | 12/2015 | Kirk | C01B 3/56 |
| | | | | 204/431 |
| 2017/0098840 | A1* | 4/2017 | Provost | H01M 8/249 |
| 2019/0002279 | A1* | 1/2019 | Dwyer | H01M 8/04559 |

FOREIGN PATENT DOCUMENTS

| | | | | |
|---|---|---|---|---|
| EP | 1942544 | A1 * | 7/2008 | H01M 8/04164 |
| EP | 2795706 | B1 | 10/2016 | |
| JP | 2006059745 | A | 3/2006 | |
| KR | 20140112037 | A | 9/2014 | |
| WO | 2006003158 | A1 | 1/2006 | |

OTHER PUBLICATIONS

Ahluywalia et al., Build up of nitrogen in direct hydrogen polymer-electrolyte fuel cell stacks, Journal of power sources, 2007, 171, 63-71 (Year: 2007).*

Chen et al., Nitrogen blanketing front equilibria in dead end anode fuel cell operation, 2011 American Control Conference, San Francisco CA, USA, Jun. 29-Jul. 1, 2011 (Year: 2011).*

Chen et al., Optimization of purge cycle for dead-ended anode fuel cell operation, Int. Journal of hydrogen energy, 2013, 38, 5092-5105 (Year: 2013).*

Mokmeli et al., An investigation in the effect of anode purging on the fuel cell performance, Int. Journal of hydrogen energy, 2010, 35, 9276-9282 (Year: 2010).*

Matsuura et al., Degradation phenomena in PEM fuel cell with dead-end anode, Int. Journal of hydrogen energy, 2013, 38, 11346-11356 (Year: 2013).*

PCT International Search Report and Written Opinion of International Searching Authority mailed Apr. 11, 2022 corresponding to PCT International Application No. PCT/EP2021/079657 filed Oct. 26, 2021.

* cited by examiner

ARRANGEMENT AND METHOD FOR DETERMINING HYDROGEN PURITY

CROSS REFERENCE TO RELATED APPLICATIONS

This application is the US National Stage of International Application No. PCT/EP2021/079657 filed 26 Oct. 2021, and claims the benefit thereof. The International Application claims the benefit of German Application No. 10 2020 214 583.0 filed 19 Nov. 2020. All of the applications are incorporated by reference herein in their entirety.

FIELD OF INVENTION

The invention relates to a device for determining the purity of hydrogen. The invention furthermore relates to a fuel cell arrangement comprising device of this type. Finally, the invention relates to a method for determining the purity of hydrogen.

BACKGROUND OF INVENTION

In a fuel cell, the electrochemical combination of hydrogen (H2) and oxygen (O2) to form water (H2O) results in the generation of electric current with high efficiency. The process of combining hydrogen and oxygen takes place at an electrolyte. A single fuel cell supplies an operating voltage of a maximum of approximately 1.1 V. Therefore, a large number of fuel cells are often interconnected to form a fuel cell stack. Operating voltages of 100 V or more can be generated by series-connected fuel cells.

During operation, a hydrogen-containing gas and an oxygen-containing gas are fed to a fuel cell. These two gases are referred to as operating gases hereinafter. By way of example, methane, natural gas, coal gas or pure hydrogen (H2) is used as fuel gas. Generally air, but also pure oxygen (O2), is used as oxidation gas. For operation of the fuel cell, the fuel gas is guided into the anode gas space of the fuel cell, from where it passes through the gas-permeable anode to the electrolyte. The oxidation gas is guided into the cathode gas space of the fuel cell and from there also advances to the electrolyte through the likewise gas-permeable cathode. Depending on the permeability of the electrolyte to oxygen or hydrogen ions, the oxygen ions from the oxidation gas and the hydrogen ions from the fuel gas are brought together at one side or the other of the electrolyte, as a result of which the electrochemical combination of hydrogen and oxygen to form water then results in the generation of current and also heat.

For fault-free operation, fuel cells require the operating gas hydrogen in a sufficiently high purity. In the case of industrial gases, the purity is expressed with the aid of code values. In this case, the first digit denotes the number of "nines", and the second digit is the first decimal place deviating from "nine". By way of example, hydrogen 5.0 stands for a purity in which the proportion by volume of hydrogen is 99.9990%. A continuous determination of the quality/purity of hydrogen for operation in fuel cells with a sufficiently high accuracy is not possible at the present time.

At the present time, indeed, a measurement of the gas quality of hydrogen is actually possible only with very great complexity. It is carried out with the aid of gas chromatographs to which gas samples are fed. In order to be able to examine a corresponding purity, these gas samples have to be taken from the operating gas. However, the accuracy of this measuring method also has its limits (a quality of 5.0 hydrogen cannot be detected in standard measuring set-ups), nor can it determine all foreign gas proportions.

SUMMARY OF INVENTION

It is an object of the invention to provide a device for determining the purity of hydrogen which allows a determination of a gas quality. In particular, the device is intended to allow a continuous determination of the gas quality. Furthermore, it is an object of the invention to provide a fuel cell arrangement having a device for determining the purity of hydrogen. Finally, it is an object of the invention to specify a corresponding method for determining the purity of a gas, in particular hydrogen.

The invention achieves the object directed to a device for determining the purity of hydrogen by virtue of the fact that the invention provides that device of this type for determining the purity of hydrogen, comprising a measurement fuel cell cascade having at least one measurement fuel cell, a hydrogen inlet and a hydrogen outlet, further comprising a cell voltage monitoring unit, which is electrically connected to the measurement fuel cell cascade and monitors a voltage output of the measurement fuel cell cascade, and a valve arranged downstream of the measurement fuel cell cascade in the flow direction of the hydrogen for allowing dead-end operation of the measurement fuel cell cascade, comprises an evaluation unit, which is connected to the cell voltage monitoring unit and receives a signal corresponding to a voltage output of the measurement fuel cell cascade as a function of time from the cell voltage monitoring unit, wherein the evaluation unit is designed to ascertain the purity of hydrogen from the received signal.

The invention provides dead-end operation on the hydrogen side (anode side), and also oxygen or air operation on the cathode side. Dead-end operation denotes operation without recirculation and with the exhaust gas valve completely closed. As a result of dead-end operation on the hydrogen side, a very clear statement about the hydrogen purity (even up to 5.0) can be made on the basis of the cell voltage profile U(t) and, for example, a purge frequency.

In this case, it is advantageous if the evaluation unit comprises a microprocessor configured such that it compares the signal corresponding to a voltage output of the measurement fuel cell cascade with a library of stored voltage outputs.

The object directed to a fuel cell arrangement is achieved by means of a fuel cell arrangement comprising a fuel cell stack having at least two fuel cell cascades disposed one downstream of another in the flow direction of the hydrogen, said fuel cell cascades each comprising a plurality of series-connected fuel cells and being connected to one another via a hydrogen line, wherein at least one water separator is arranged in the hydrogen line, wherein the fuel cell arrangement furthermore comprises a device for determining the purity of hydrogen, wherein the measurement fuel cell cascade is the last fuel cell cascade in the fuel cell stack in the hydrogen flow direction. The longer the hydrogen flow distance, the more strongly/rapidly the effect observable as a result of contamination occurs in the voltage change or the more accurately the determination of the hydrogen purity becomes. By virtue of cascading, therefore, it is possible to obtain a higher effect than with only a single non-cascaded fuel cell cascade.

During the operation of the fuel cells, product water and inert gases, but also other contaminants, pass to the anode sides of the fuel cells and ultimately accumulate, in particular in the anode exhaust gas path. The product water can lead to damage to apparatus components and to the blocking of flow paths. The use of water separators is therefore expedient.

In an alternative a fuel cell arrangement comprising a fuel cell stack having a fuel cell cascade comprising a plurality of series-connected fuel cells, wherein the fuel cell arrangement furthermore comprises a device for determining the purity of hydrogen, the at least one measurement fuel cell cascade is connected in parallel with the fuel cell cascade with respect to a hydrogen supply. In this way, the "main path" can be operated continuously, while the cell voltage can be monitored and the hydrogen purity can be determined by way of a parallel-connected device for determining the purity.

The object directed to a method is achieved by means of a method for determining the purity of hydrogen in which hydrogen is fed to a measurement fuel cell cascade having at least one measurement fuel cell via a hydrogen inlet, a valve arranged downstream of the measurement fuel cell cascade in the flow direction of the hydrogen for allowing dead-end operation of the measurement fuel cell cascade is closed and a voltage of the measurement fuel cell cascade is measured, wherein the purity of hydrogen is ascertained by way of the voltage of the measurement fuel cell cascade as a function of time.

What is intrinsic to a measurement is that it cannot be arbitrarily accurate. That is owing to the design-dictated accuracy of the measuring instruments, but possibly also the influence thereof on the variable to be measured (by way of example, the measuring instrument may occur as an additional "consumer" of electrical energy). Finally, the measured values themselves may also be subject to fluctuations. It is therefore expedient to alter as few parameters as possible during the measurement. Such a situation is present if a hydrogen operating current is kept constant during the determination of the cell voltage.

Therefore, it is also advantageous if the cell voltage is repeatedly measured and the time between two measurements is predetermined.

Alternatively, it may also be advantageous if the time is determined which elapses until the cell voltage has fallen from a first voltage value to a second voltage value.

It is expedient if the ascertained values are compared with previously known values and a degree of purity of the hydrogen is derived therefrom.

A lengthening of the hydrogen flow path improves the measurement with regard to duration or accuracy. It is therefore advantageous if in a fuel cell arrangement the measurement fuel cell cascade having at least one measurement fuel cell is arranged as the last fuel cell cascade in the hydrogen flow direction and a cell voltage of the measurement fuel cell cascade is measured.

As an alternative to a measurement at the end of a fuel cell stack, it may be advantageous if in a fuel cell arrangement the measurement fuel cell cascade having at least one measurement fuel cell is arranged in parallel with further fuel cell cascades in the hydrogen flow direction and a cell voltage of the measurement fuel cell cascade is measured.

The present invention enables the gas quality or gas purity to be determined by depletion of the reaction gases in the fuel cell and measurement of the corresponding cell voltage by way of the gas consumption. This process can constantly proceed concomitantly, e.g. in a bypass with respect to the main volumetric flow, in order to obtain a quasi-continuous measurement.

BRIEF DESCRIPTION OF THE DRAWINGS

The invention will be explained in greater detail by way of example with reference to the drawings, in which, schematically and not to scale.

DETAILED DESCRIPTION OF INVENTION

Figure 1:
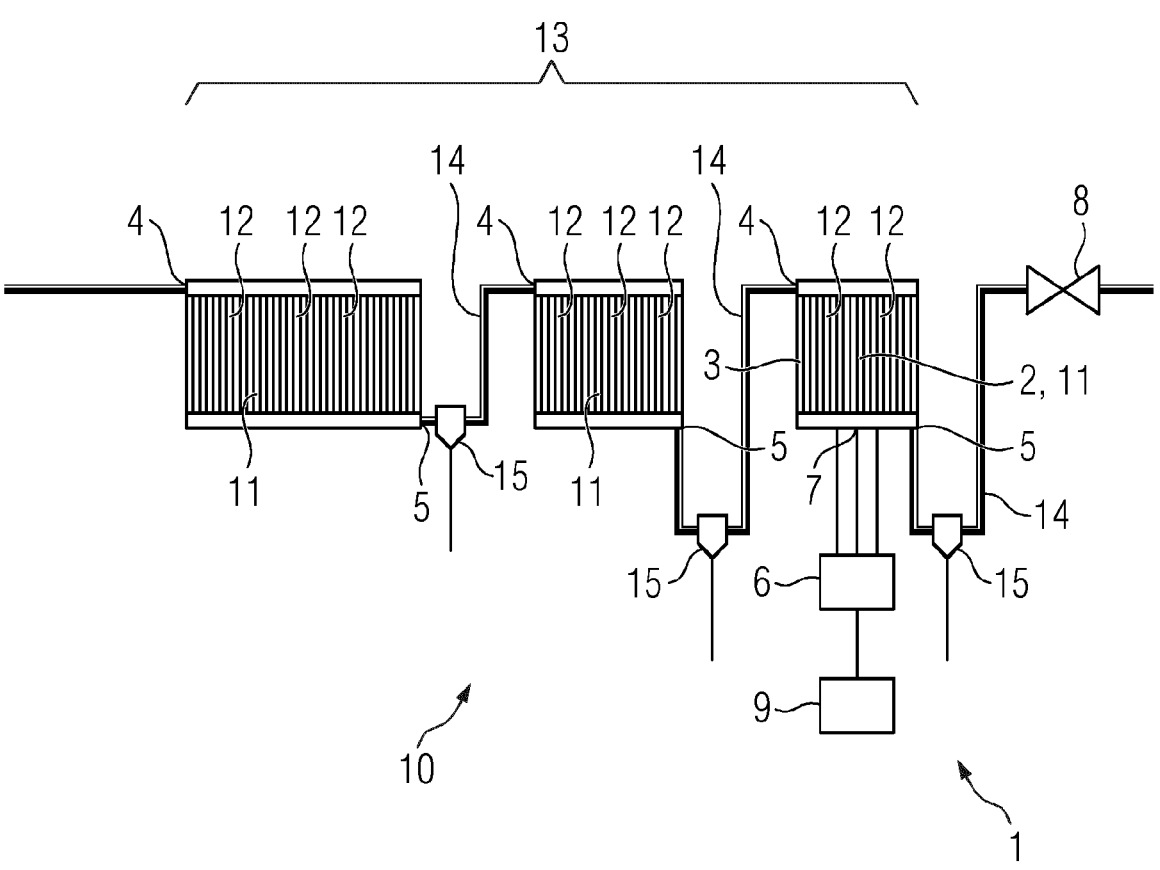
FIG. 1 shows a fuel cell arrangement with serial arrangement of the device for determining the purity of hydrogen according to the invention.

FIG. 1 shows a fuel cell arrangement 10 comprising a fuel cell stack 13 having three fuel cell cascades 11, which are connected to one another via a hydrogen line 14. Each fuel cell cascade 11 can be constructed from a plurality of fuel cells 12 electrically connected in series and has a hydrogen inlet 4 and a hydrogen outlet 5. A respective water separator 15 is arranged in the hydrogen line 14 downstream of the fuel cell cascades 11 in the hydrogen flow direction.

In the embodiment of a fuel cell arrangement 10 according to the invention as shown in FIG. 1, the purity of hydrogen is determined in a serial arrangement of the device 1 for determining the purity of hydrogen. For this purpose, a fuel cell cascade 11 designated as measurement fuel cell cascade 2 is arranged as the last fuel cell cascade 11 in the fuel cell stack 13 in the flow direction of hydrogen. In this case, a measurement fuel cell cascade 2 comprises at least one measurement fuel cell 3. Within a measurement fuel cell cascade 2, the fuel cell 12 supplied first is preferably used as measurement fuel cell 3.

According to the invention, the purity of hydrogen is determined by way of the measurement of the voltage at the measurement fuel cell cascade 2. For this purpose, a cell voltage monitoring unit 6 is electrically connected to the measurement fuel cell cascade 2. Furthermore, a valve 8 is arranged downstream of the measurement fuel cell cascade 2 in the flow direction of the hydrogen, and allows dead-end operation of the measurement fuel cell cascade 2 or of the entire fuel cell arrangement 10.

According to the invention, the device 1 for determining the purity of hydrogen furthermore has an evaluation unit 9, which is connected to the cell voltage monitoring unit 6 and receives a signal corresponding to a voltage output 7 of the measurement fuel cell cascade 2 as a function of time from the cell voltage monitoring unit 6, wherein the evaluation unit 9 is designed to ascertain the purity of hydrogen from the received signal.

The evaluation unit 9 comprises a microprocessor configured such that it compares the signal corresponding to a voltage output 7 of the measurement fuel cell cascade 2 with a library of stored voltage values.

Figure 2:
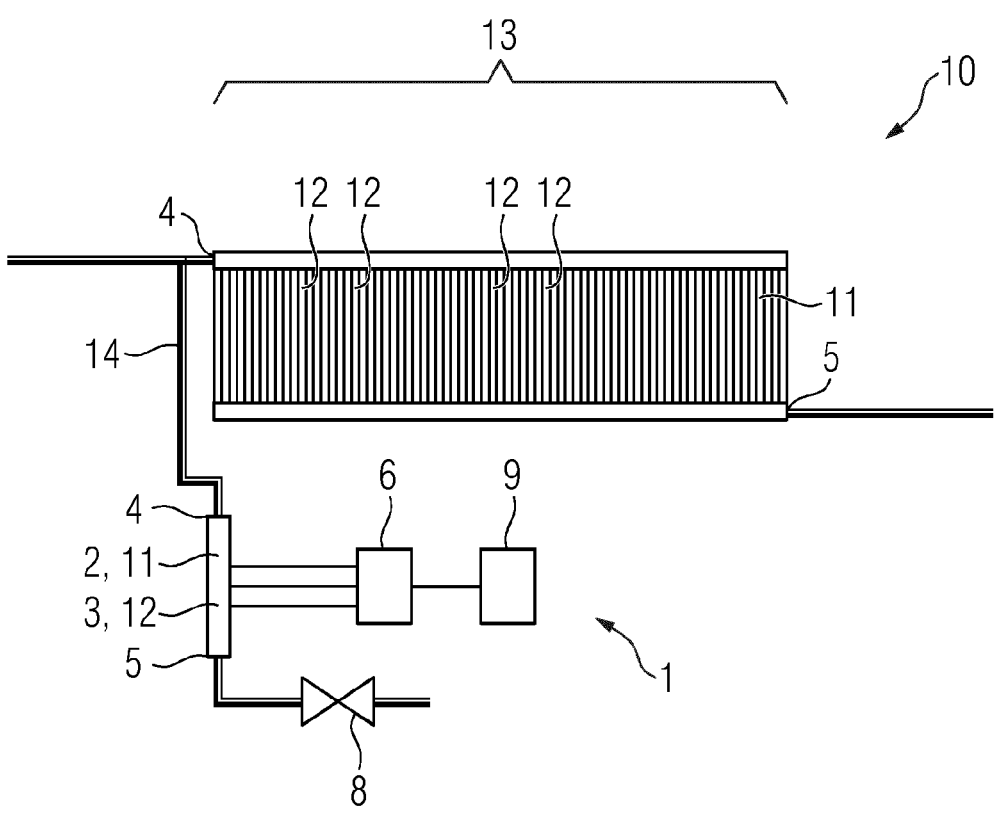
FIG. 2 shows a fuel cell arrangement with parallel arrangement of the device for determining the purity of hydrogen according to the invention.

FIG. 2 shows a second embodiment of the device 1 for determining the purity of hydrogen according to the invention, in which, in relation to a fuel cell cascade 11 having fuel cells 12 electrically connected in series therein, a measurement fuel cell cascade 2 having at least one measurement fuel cell 3 is connected in parallel with the fuel cell cascade 11 with respect to a hydrogen supply. An electrical voltage of the measurement fuel cell cascade 2 having the at least one measurement fuel cell 3 is measurable by means of the cell voltage monitoring unit 6.

Figure 3:
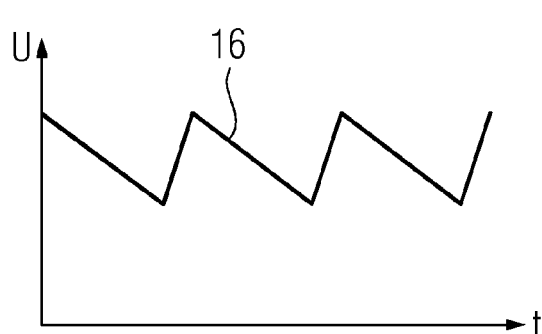
FIG. 3 shows the profile of a cell voltage in dead-end operation of a fuel cell, periodically interrupted by comparatively short purge processes.

FIG. 3 shows the temporal profile of a cell voltage 16 during dead-end operation of a measurement fuel cell cascade 2. The voltage curve is not dissimilar to a relaxation oscillation or sawtooth oscillation, except that in the present case the voltage curve 16 falls substantially continuously and then rises abruptly when purging takes place via valve 8. If the measurement fuel cell cascade 2 is driven in dead-end operation, it is important for stable, efficient and material-preserving operation of the measurement fuel cell cascade 2 to regularly purge the anode side (=hydrogen side) in order to remove unwanted substances, such as inert gases or reaction water. For this purpose, the valve 8 is periodically opened, the opened phase being short in comparison with the closed phase.

This process typically takes place very regularly and is either predefined or determined depending on a load current intensity and the amount of reaction water produced, which is somewhat more complex but also allows more efficient operation of a fuel cell. The greater the current intensity or the quantity of charge, the more frequently purging has to take place.

With medium loading of a fuel cell, the valve 8 on the anode outlet side has to be opened for 1 to 2 s at intervals of a few seconds to a few minutes ("purging").

At the end of the comparatively short purging process, the cell voltage is at a maximum again.

The present invention provides dead-end operation on the hydrogen side, and also oxygen or air operation on the cathode side. As a result of dead-end operation on the hydrogen side, a very clear statement about the hydrogen purity (even up to 5.0) can be made on the basis of the cell voltage profile U(t) and a purge frequency.

Figure 4:
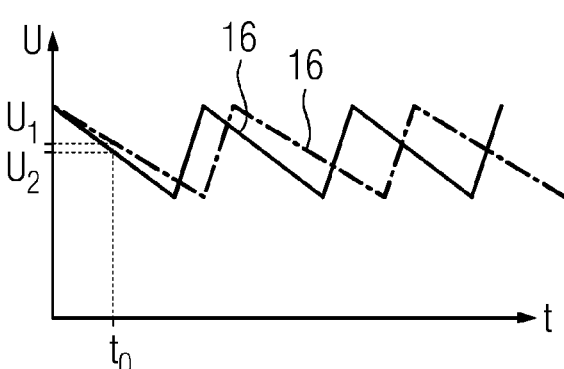
FIG. 4 shows the cell voltage profile for hydrogen of varying purity, with a voltage measurement at a predefined point in time.
Figure 5:
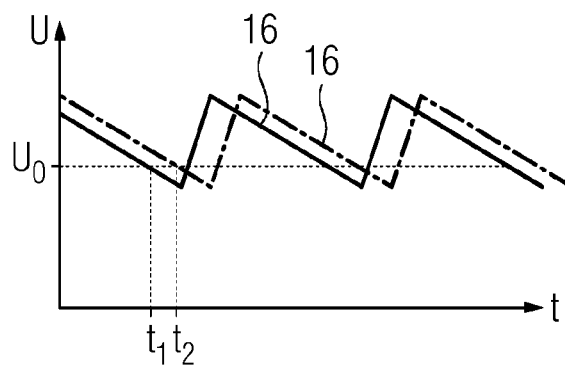
FIG. 5 shows the cell voltage profile for hydrogen of varying purity, with time measurement.

According to the invention, it is not absolutely necessary, however, to determine the purity of the hydrogen by way of the purge frequency. Examples are shown on the basis of the temporal voltage profiles in FIGS. 4 and 5. In this case, FIG. 4 shows a first alternative, in which a second voltage value is measured at a given point in time or after a given elapsed time starting from a determined first voltage value. The second alternative shown in FIG. 5, by contrast, determines the time after which the measured voltage falls below a previously defined voltage value.

The invention claimed is:

1. A device for determining a purity of hydrogen, comprising:

a measurement fuel cell cascade comprising a plurality of series-connected fuel cells and being connected to one another via a hydrogen line, a hydrogen inlet and a hydrogen outlet, wherein at least one measurement fuel cell is a first fuel cell in the measurement fuel cell cascade with respect to a flow direction of the hydrogen, a cell voltage monitoring unit, which is electrically connected to the at least one measurement fuel cell and monitors a voltage output of the at least one measurement fuel cell, a valve arranged downstream of the measurement fuel cell cascade in the flow direction of the hydrogen for allowing dead-end operation of the measurement fuel cell cascade, an evaluation unit, which is connected to the cell voltage monitoring unit and receives a signal corresponding to the voltage output of the at least one measurement fuel cell as a function of time from the cell voltage monitoring unit, wherein the evaluation unit comprises a microprocessor configured to compare the signal corresponding to the voltage output of the at least one measurement fuel cell with a library of stored voltage outputs to determine the purity of the hydrogen.

2. A fuel cell arrangement, comprising:

a fuel cell stack having at least two fuel cell cascades disposed one downstream of another in a flow direction of hydrogen, said at least two fuel cell cascades each comprising a plurality of series-connected fuel cells and being connected to one another via a hydrogen line, wherein at least one water separator is arranged in the hydrogen line, a device for determining a purity of hydrogen as claimed in claim 1, wherein the measurement fuel cell cascade is a last fuel cell cascade in the fuel cell stack in the flow direction of the hydrogen.

3. A fuel cell arrangement, comprising:

a fuel cell stack having a fuel cell cascade comprising a plurality of series connected fuel cells, a device for determining a purity of hydrogen as claimed in claim 1, wherein the measurement fuel cell cascade is connected in parallel with the fuel cell cascade with respect to a hydrogen supply.

4. The device as claimed in claim 1, wherein the purity of the hydrogen determined by the evaluation unit is a numerical value that expresses the purity of the hydrogen as a proportion by volume of the hydrogen.

5. The device as claimed in claim 4, wherein the evaluation unit continuously determines the purity of the hydrogen.

6. The device as claimed in claim 1, wherein the cell voltage monitoring unit comprises electrical connections that electrically connect the cell voltage monitoring unit to the at least one measurement fuel cell.

7. The device as claimed in claim 1, wherein the device is configured to keep a hydrogen operating current constant when monitoring the voltage output of the at least one measurement fuel cell.

8. A fuel cell arrangement, comprising:

a fuel cell stack having at least two fuel cell cascades disposed one downstream of another in a flow direction of hydrogen, said at least two fuel cell cascades each comprising a plurality of series-connected fuel cells and being connected to one another via a hydrogen line, a device for determining a purity of hydrogen as claimed in claim 1, wherein the measurement fuel cell cascade is a last fuel cell cascade in the fuel cell stack in the flow direction of the hydrogen.

9. A method for determining a purity of hydrogen in the device of claim 1, comprising:

feeding the hydrogen to the measurement fuel cell cascade having the at least one measurement fuel cell via the hydrogen inlet, closing the valve arranged downstream of the measurement fuel cell cascade in the flow direction of the hydrogen for allowing dead-end operation of the measurement fuel cell cascade and measuring the voltage output of the at least one measurement fuel cell, determining the purity of the hydrogen by way of the voltage output as a function of time and by way of hydrogen consumption via an evaluation unit, wherein the evaluation unit comprises a microprocessor configured to compare the voltage output of the at least one measurement fuel cell with a library of stored voltage outputs to determine the purity of the hydrogen.

10. The method as claimed in claim 9,
wherein a hydrogen operating current is kept constant during measuring the voltage output of the at least one measurement fuel cell.

11. The method as claimed in claim 9,
wherein the voltage output of the at least one measurement fuel cell is repeatedly measured and a time interval between two measurements is predetermined.

12. The method as claimed in claim 9,
wherein a duration is determined for a period of time required for the voltage output of the at least one measurement fuel cell to decrease from a first voltage value to a second voltage value.

13. The method as claimed in claim 9,
wherein in a fuel cell arrangement the measurement fuel cell cascade having the at least one measurement fuel cell is arranged as the last fuel cell cascade in the flow direction of the hydrogen.

14. The method as claimed in claim 9,
wherein in a fuel cell arrangement the measurement fuel cell cascade having the at least one measurement fuel cell is arranged in parallel with further fuel cell cascades in the flow direction of the hydrogen.

\* \* \* \* \*